(12) United States Patent
McGrane et al.

(10) Patent No.: US 9,409,754 B2
(45) Date of Patent: Aug. 9, 2016

(54) PIGGYBACK FORKLIFT TRUCK AND METHOD OF OPERATING SAME

(71) Applicant: Cargotec Research & Development Ireland Limited, Dundalk (IE)

(72) Inventors: Barry McGrane, Clogerhead (IE); Kevin Turnbull, Dundalk (IE)

(73) Assignee: Cargotec Research & Development Ireland Limited, Dundalk (IE)

( * ) Notice: Subject to any disclaimer, the term of this patent is extended or adjusted under 35 U.S.C. 154(b) by 775 days.

(21) Appl. No.: 13/864,518

(22) Filed: Apr. 17, 2013

(65) Prior Publication Data
US 2013/0271087 A1    Oct. 17, 2013

(30) Foreign Application Priority Data

Apr. 17, 2012  (GB) .................................. 1206762.5
Apr. 17, 2012  (GB) .................................. 1206763.3

(51) Int. Cl.
| | |
|---|---|
| H02J 7/00 | (2006.01) |
| B66F 9/075 | (2006.01) |
| B60L 11/18 | (2006.01) |
| B66F 9/20 | (2006.01) |

(52) U.S. Cl.
CPC ............ *B66F 9/075* (2013.01); *B60L 11/1811* (2013.01); *B60L 11/1816* (2013.01); *B66F 9/07563* (2013.01); *B66F 9/205* (2013.01); *B60L 2200/42* (2013.01); *Y02T 10/7005* (2013.01); *Y02T 10/7011* (2013.01); *Y02T 10/7072* (2013.01); *Y02T 90/127* (2013.01); *Y02T 90/14* (2013.01); *Y02T 90/16* (2013.01)

(58) Field of Classification Search
USPC .......................................................... 320/137
See application file for complete search history.

(56) References Cited

U.S. PATENT DOCUMENTS

| | | | | |
|---|---|---|---|---|
| 5,119,011 | A * | 6/1992 | Lambert ............. | B60L 11/1862 318/139 |
| 6,487,094 | B1 * | 11/2002 | Weng ...................... | H02M 1/34 363/21.12 |
| 6,556,020 | B1 * | 4/2003 | McCabe ............ | G01R 31/3662 320/132 |
| 8,188,708 | B2 * | 5/2012 | Altekruse ............. | H01F 27/325 320/104 |
| 2006/0043914 | A1* | 3/2006 | Langlotz ................. | B60L 7/003 318/139 |
| 2006/0055373 | A1* | 3/2006 | Bopp ................... | G01R 31/362 320/132 |
| 2006/0237242 | A1* | 10/2006 | Burke ...................... | B60K 6/32 180/23 |
| 2011/0117419 | A1* | 5/2011 | Lee ..................... | H01M 2/1077 429/156 |

* cited by examiner

*Primary Examiner* — Yalkew Fantu
(74) *Attorney, Agent, or Firm* — Brian J. Colandreo; Jeffrey T. Placker; Holland & Knight LLP

(57) ABSTRACT

This invention relates to a piggyback forklift truck and a method of operating same. The piggyback forklift truck comprises a motive power unit which includes an electric motor, a rechargeable battery pack powering the electric motor, a battery pack charging unit, a first electricity power supply connector in electrical communication with the battery pack charging unit, a DC/AC converter in electrical communication with the battery pack charging unit, and a second electricity power supply connector in electrical communication with the DC/AC converter, the second electricity power supply being arranged for reception of an electrical power take off feed from a carrying vehicle. In this way, the piggyback forklift truck can be charged by the mains supply when the carrying vehicle is not in transit and can be trickle charged while the carrying vehicle is in transit. This will maximize the operating time of the electrically powered piggyback forklift truck while it is making deliveries to customers.

21 Claims, 4 Drawing Sheets

PIGGYBACK FORKLIFT TRUCK AND METHOD OF OPERATING SAME

RELATED APPLICATIONS

This application is based on and claims the benefit of priority from United Kingdom Patent Application No. 1206763.3, filed 17 Apr. 2012 and United Kingdom Patent Application No. 1206762.5, filed 17 Apr. 2012, the entire disclosure of which are incorporated herein by reference.

TECHNICAL FIELD OF THE INVENTION

This invention relates to a piggyback forklift truck. More specifically, this invention relates to a piggyback forklift truck powered by an electric motor.

BACKGROUND OF THE INVENTION

Piggyback forklift trucks are a highly specialised type of lightweight forklift truck that can be mounted on the rear of an articulated chassis for transport to and from customer's premises. Once at the customer's premises, the piggyback forklift truck can be dismounted from the rear of the articulated chassis and used to load and unload goods from the articulated chassis before being remounted onto the rear of the articulated chassis for transport to the next customer's premises.

Out of necessity, the piggyback forklift trucks must be lightweight as any increase in piggyback forklift truck weight will correspond to a decrease in available haulage capacity of the articulated chassis on which it is mounted. Furthermore, the piggyback forklift trucks must be compact in a fore and aft sense as the amount by which the piggyback forklift truck may protrude from the rear of the carrying vehicle (commonly referred to as "overhang") is restricted by law in many jurisdictions. In addition to this, the greater the overhang, the greater the forces applied to the mounting kit and piggyback forklift equipment used to mount the piggyback forklift on the carrying vehicle. Increased forces necessitate reinforcement of these components which typically leads to increased weight which as described above is highly undesirable.

The present invention is concerned solely with this type of specialised lightweight piggyback forklift truck and is to be considered in light of the limitations of piggyback forklift trucks. The present invention is in no way intended to relate to other types of forklift trucks such as the commonplace heavyweight counterbalanced forklift trucks that are not so restricted and do not require the same design considerations. Furthermore, the present invention is in no way intended to relate to pallet loaders and other lightweight electrically-powered hand-operated carts that also are not restricted by the same design considerations but rather the invention relates specifically to a piggyback forklift truck with a U-shaped chassis and a driver's seating station.

Heretofore, electric motors have been deemed unsuitable for use with piggyback forklift trucks. This is due partially to the fact that in order to provide a battery that offers sufficient operating time between charging cycles, the battery must be relatively large. This large battery will be heavy and will increase the dimensions of the piggyback forklift truck and is therefore undesirable for use with a piggyback forklift truck. Secondly, due to the fact that the piggyback forklift trucks are used far away from the operators premises and the battery charging equipment, if the piggyback forklift truck runs out of battery power when located remotely from the operator's premises, this would present a significant problem to the operator as they would have to send specialised equipment to retrieve the piggyback forklift truck.

It is an object therefore of the present invention to provide a piggyback forklift truck and a method of operating same that overcomes at least some of the above-mentioned problems and that provides a useful choice for the consumer. It is a further object of the present invention to provide an electrically powered piggyback forklift truck that maximises the amount of operational time between charging cycles without having to provide a prohibitively large battery.

SUMMARY OF THE INVENTION

According to the invention there is provided piggyback forklift truck comprising: a wheeled U-shaped chassis comprising a pair of forwardly projecting side bars bridged by a transverse rear crossbar; a lifting assembly mounted on the chassis intermediate the pair of forwardly projecting side bars; a driver's seating station mounted on the chassis rearward of the lifting assembly; a motive power unit mounted on the chassis; and in which the piggyback forklift truck is electrically powered and the motive power unit comprises:
  an electric motor;
  a rechargeable battery pack powering the electric motor;
  a first battery pack charging unit in electrical communication with the rechargeable battery pack;
  a first electricity power supply connector in electrical communication with the first battery pack charging unit;
  a DC/AC converter in electrical communication with the first battery pack charging unit; and
  a second electricity power supply connector in electrical communication with the DC/AC converter, the second electricity power supply connector being arranged for reception of an electrical power take off feed from a carrying vehicle.

By having such a piggyback forklift truck, the piggyback forklift truck may be charged from the mains supply or other available electricity supply when the carrying vehicle is located in a depot or other location with an accessible power supply. Importantly though, the piggyback forklift truck has a second electricity power supply connector for reception of an electrical power take off feed from the carrying vehicle. When the carrying vehicle and the piggyback forklift truck mounted thereon are in transit, the piggyback forklift truck can capture the electrical power take off feed from the carrying vehicle and supply that feed to a DC/AC converter on the piggyback forklift which will be converted from a low voltage supply of the truck, for example, 24V DC to a higher voltage supply required for the charger, for example, 240V AC and thereafter provided to the battery pack charging unit of the piggyback forklift truck. In this way, the rechargeable battery pack can be recharged while the piggyback forklift truck is being moved from premises to premises, thereby increasing the operational time available to the operator of the forklift.

This is seen as a significant advantage as this will help to obviate one of the largest shortcomings of an electrically powered piggyback forklift, namely limited operational time between charging events. Throughout a normal 8 hour shift, it is not inconceivable that the forklift truck will be in transit for up to 6 hours, 75% of the total shift time. By charging the piggyback forklift during these times, the piggyback forklift will have more available power and will perform better than would otherwise be the case. In addition to the above, the addition of an on-board battery pack charging unit with associated connector and the DC/AC converter with associated connector is counterintuitive to the normal practice of piggyback forklift design as it would be thought that these items will add to the weight and size of the piggyback forklift truck.

However, the improved charging will allow for smaller batteries thereby conceivably resulting in a net gain of weight and size. Furthermore, advantageously, it is not necessary to modify the carrying vehicle by providing charging equipment on the carrying vehicle and in this way, the electrically powered piggyback forklift truck may be mounted onto any carrying vehicle with a suitable mounting arrangement. This provides greater flexibility to those entities with multiple piggyback forklifts and carrying vehicles.

In one embodiment of the invention there is provided a second battery pack charging unit in electrical communication with the rechargeable battery pack, and in which instead of the DC/AC converter being in electrical communication with the first battery pack charging unit, the DC/AC converter is in electrical communication with the second battery pack charging unit. In another embodiment of the invention, instead of providing a DC/AC converter, there is provided a DC/DC converter in electrical communication with the second battery pack charging unit and the second electricity power supply connector.

In an alternative embodiment of the invention there is provided a second battery pack charging unit in electrical communication with the rechargeable battery pack, and in which instead of providing a DC/AC converter in electrical communication with the second electrical power supply connector, the DC/AC converter is omitted and the second electrical power supply connector is connected directly to the second battery pack charging unit.

In one embodiment of the invention the first battery pack charging unit and the second battery pack charging unit are integrated into a single combined battery pack charging unit, the combined battery pack charging unit having the functionality of both the first and the second battery pack charging units.

In one embodiment of the invention the first electricity power supply connector is a female connector.

In another embodiment of the invention the first electricity power supply connector comprises a length of electrical extension cable connected at one end to the first battery pack charging unit and having a male connector mounted on its other, free end.

In one embodiment of the invention the piggyback forklift truck comprises a pair of trailer front wheels, one of which is located adjacent the forwardmost end of one of the side bars and the other of which is located adjacent the forwardmost end of the other side bar, and a driving, steering rear wheel mounted about the rear crossbar driven by the electric motor.

In one embodiment of the invention the piggyback forklift truck comprises a rear wheel assembly comprising a mounting plate for mounting the rear wheel on the chassis and about which the rear wheel is rotatably mounted, and in which a primary drive motor and a tertiary steering motor are mounted on the mounting plate.

In one embodiment of the invention there is provided a piggyback forklift truck in which the lifting assembly is fixed in position relative the U-shaped chassis and in which the lifting assembly further comprises a pair of tines and means to extend the reach of the tines. This is seen as a useful implementation as it will require less power to pick up and set down loads in front of the forklift's chassis.

In one embodiment of the invention there is provided a piggyback forklift truck in which the means to extend the reach of the tines comprises a pair of extensible tines. Again, this is seen as a very useful lightweight implementation to provide additional reach to the forklift with minimal drain on the battery supply.

In one embodiment of the invention there is provided a piggyback forklift truck in which there is provided a dedicated battery management system operable to control the charging and discharging of the battery pack. This is seen as an advantageous aspect of the present invention. If a Lithium Ion pack is used, the Lithium Ion battery pack will be made up of several cells, and each cell behaves differently i.e. each cell charges and discharges at different speeds. The battery pack without a BMS will only be as good as the weakest cell in the battery pack. The main purpose of the BMS will be to balance each cell and to charge them and discharge them in unison. The BMS will also shut down the system if there are any errors, such as if a particular cell drops to an unsafe level or if the temperature of the pack rises to an unsafe level. Again, although counterintuitive to add further equipment to the piggyback forklift truck, the battery management system enables control over battery discharge rates thereby optimizing battery performance and required time between charge cycles.

In one embodiment of the invention there is provided a piggyback forklift truck in which there is provided a pair of electric motors powered by the battery pack, a primary drive motor and a secondary lifting assembly motor. The secondary lifting assembly motor will be fitted with a small pump to power the hydraulic cylinders of the lifting equipment (e.g. one or more of lift, tilt, side shift and reach cylinders).

In one embodiment of the invention there is provided a piggyback forklift truck in which there is provided a third electric motor powered by the battery pack, a tertiary steering motor. The electric steering motor is seen as a useful alternative to the existing solutions such as the use of a cylinder to rotate the rear wheel using a hydraulic steering motor. The electric steering motor has better power efficiency and requires less space on the machine than the previous solutions.

In one embodiment of the invention there is provided a piggyback forklift truck in which the battery pack comprises a lithium ion battery pack.

In one embodiment of the invention there is provided a method of operating a piggyback forklift truck as claimed in the preceding claims comprising the steps of:

charging the rechargeable battery pack of the piggyback forklift using an electrical power take off feed from a carrying vehicle when the carrying vehicle is in transit with the piggyback forklift truck mounted thereon.

This is seen as a particularly advantageous aspect of the present invention. By charging the electrically powered piggyback forklift truck during transit, the piggyback forklift truck will have a longer operational period between charging cycles and furthermore additional power will often be available to the operator of the forklift than would otherwise be the case.

In one embodiment of the invention there is provided a method in which the step of charging the rechargeable battery pack of the piggyback forklift using an electrical power take off feed from a carrying vehicle comprises the steps of:

taking an electrical power take off feed from the carrying vehicle when the carrying vehicle is in transit with the piggyback forklift truck mounted thereon;

delivering the electrical power take off feed to a DC/AC converter mounted on the piggyback forklift truck;

converting the electrical power take off feed from the carrying vehicle in the DC/AC converter on the piggyback forklift truck; and passing the converted AC electrical power take off feed to the battery pack charging unit of the piggyback forklift truck.

In one embodiment of the invention there is provided a method in which the step of charging the rechargeable battery pack of the piggyback forklift using an electrical power take off feed from a carrying vehicle comprises the steps of:

taking an electrical power take off feed from the carrying vehicle when the carrying vehicle is in transit with the piggyback forklift truck mounted thereon;

delivering the DC electrical power take off feed to a second battery pack charging unit of the piggyback forklift truck.

In one embodiment of the invention there is provided a method comprising the intermediate step of delivering the DC electrical power take off feed to a DC/DC converter en route to the second battery pack charging unit.

In one embodiment of the invention, the method comprises the intermediate step of delivering the DC electrical power take off feed to a DC/AC converter en route to the second battery pack charging unit.

In one embodiment of the invention there is provided a method comprising the step of trickle charging the rechargeable battery pack using an electrical power take off feed from a carrying vehicle when the piggyback forklift truck is in transit on the carrying vehicle. Trickle charging is seen as a useful way to charge the piggyback forklift trucks rechargeable battery pack without having a detrimental effect on the battery pack of the carrying vehicle.

In one embodiment of the invention there is provided a method comprising the step of charging the rechargeable battery pack from a mains electricity supply using the first electricity power supply connector when the carrying vehicle is not in transit.

BRIEF DESCRIPTION OF THE DRAWINGS

The invention will now be more clearly understood from the following description of some embodiments thereof given by way of example only with reference to the accompanying drawings, in which.

DETAILED DESCRIPTION OF THE INVENTION

Figure 1:
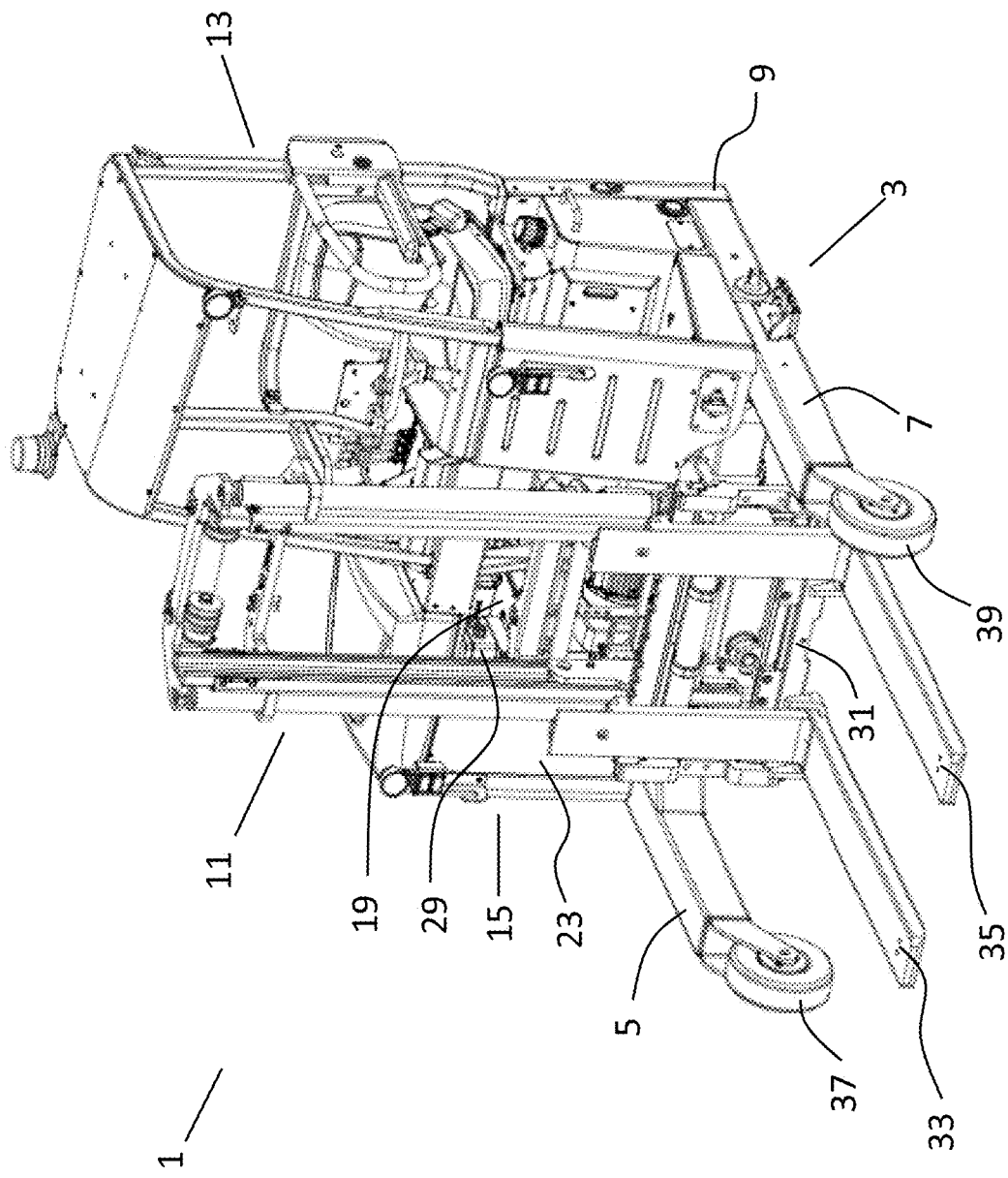
FIG. 1 is a front perspective view of a piggyback forklift truck according to the invention.
Figure 2:
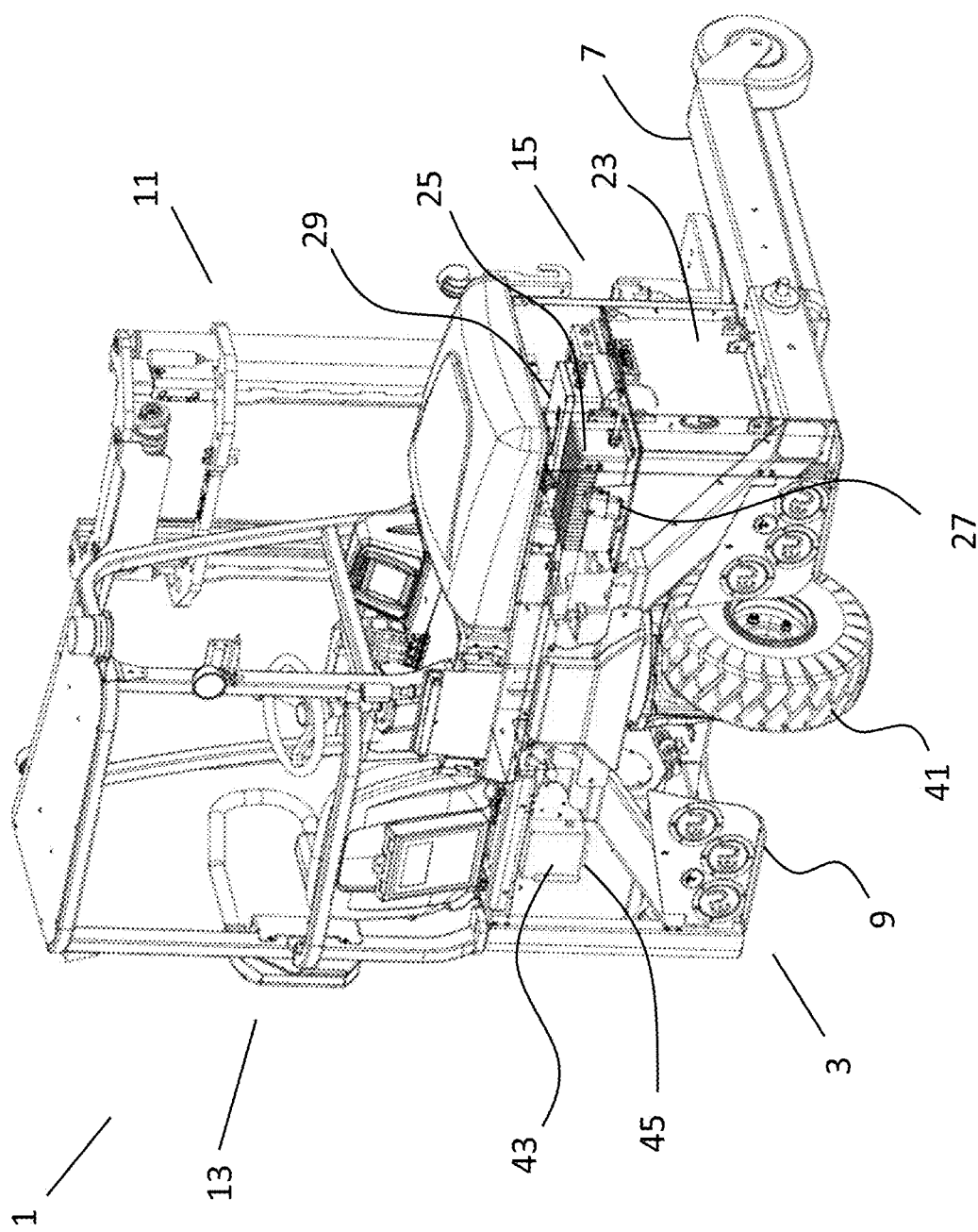
FIG. 2 is a rear perspective, partially cut-away view of a piggyback forklift truck according to the invention.

Referring to FIGS. 1 and 2, there is shown a piggyback forklift truck, indicated generally by the reference numeral 1, comprising a wheeled U-shaped chassis 3 comprising a pair of forwardly projecting side bars 5, 7 bridged by a transverse rear crossbar 9. The piggyback forklift truck 1 comprises a lifting assembly 11 mounted on the chassis 3 intermediate the pair of forwardly projecting side bars 5, 7, a driver's seating station 13 mounted on the chassis rearward of the lifting assembly, and a motive power unit 15 mounted on the chassis. The piggyback forklift truck is electrically powered and the motive power unit 15 comprises a primary electric drive motor, a secondary lifting assembly motor and a tertiary steering motor. The motive power unit 15 further comprises a rechargeable battery pack 23, in this case a Lithium Ion battery pack, for powering the electric motor, a battery pack charging unit 25 in electrical communication with the rechargeable battery pack 23 and a first electricity power supply connector 27 in electrical communication with the battery pack charging unit. The first electricity power supply connector 27 comprises a female connector suitable for reception of a male connector (not shown) connected to a power supply such as the mains power supply. Furthermore, there is provided a battery management system 29 provided to control the charging and discharging rates of the cells in the battery pack 23.

Figure 3:
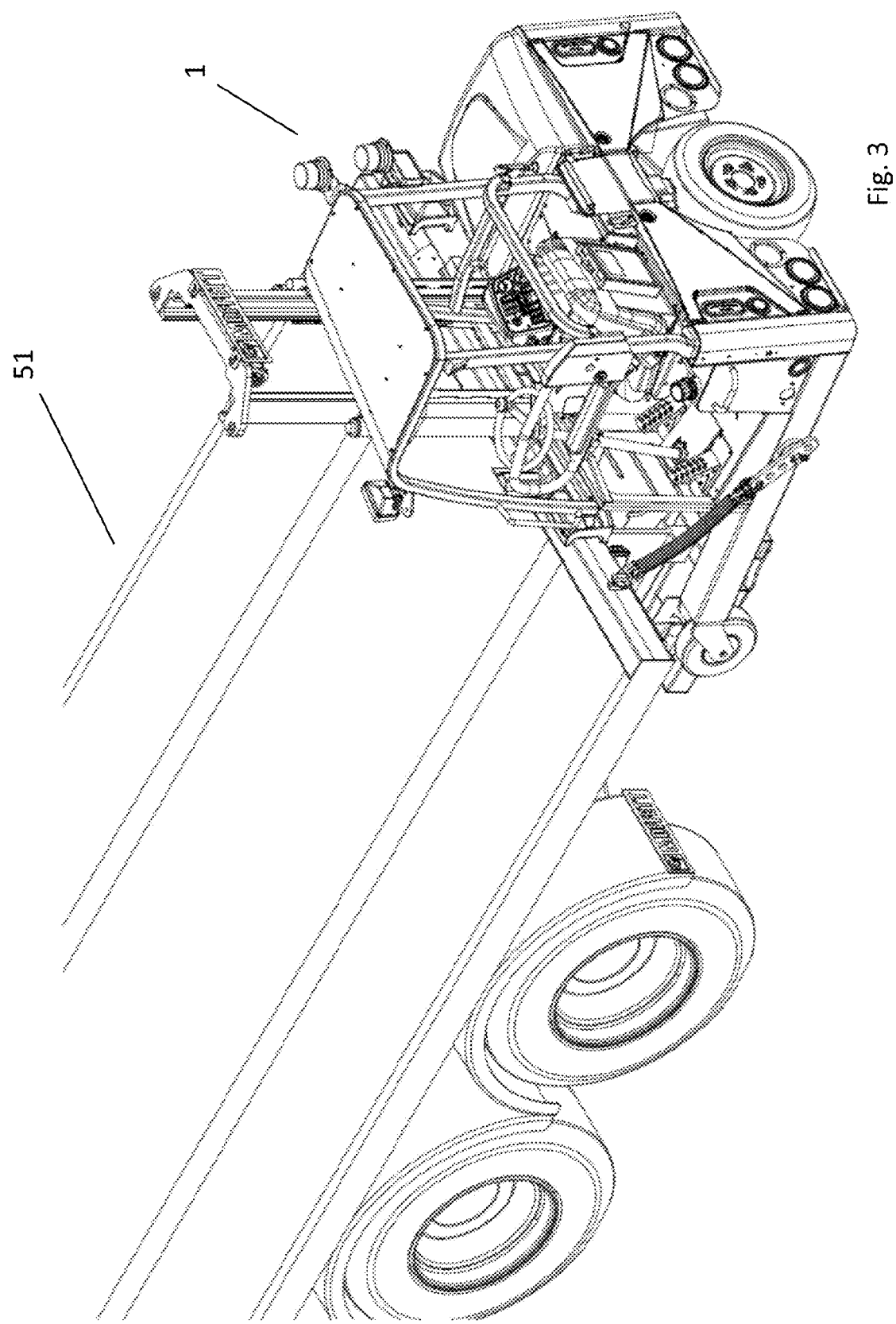
FIG. 3 is a rear perspective view of a piggyback forklift truck according to the invention mounted on the rear of an articulated chassis.

The piggyback forklift truck's lifting assembly in the embodiment shown comprises an upright, duplex mast fixed in position on the chassis 3. The chains and hydraulic hoses have been removed for clarity. The lifting assembly comprises a fork carriage 31 carrying forks 33, 35. The fork carriage 31 is moveable up and down the mast in the known manner. The forks 33, 35 are extensible forks to provide additional reach to the forklift to allow goods to be picked up and set down in front of the front wheels 37, 39. The front wheels 37, 39 are trailer wheels or in other words are not driven directly by the motive power unit 15. The rear wheel 41 is a driving, steering wheel, powered directly by the motive power unit 15 and steerable through a steering mechanism in the driver's station 13. In the embodiment shown, the side bars and the front wheels are retractable on the chassis if required to permit mounting of the forklift on a carrying vehicle 51, in this case only part of which, namely the articulated chassis, is shown in FIG. 3.

Referring once more to FIG. 2, there is further provided a DC/AC power converter 43 mounted on the chassis 3 and a second electricity power supply connector 45. The DC/AC power converter 43 is in electrical communication with the battery pack charging unit 25 and the second electricity power supply connector 45 is in electrical communication with the DC/AC converter 43. The second electricity power supply connector 45 is arranged for reception of an electrical power take off feed from a carrying vehicle (indicated by the numeral 51 in FIG. 3).

Figure 4:
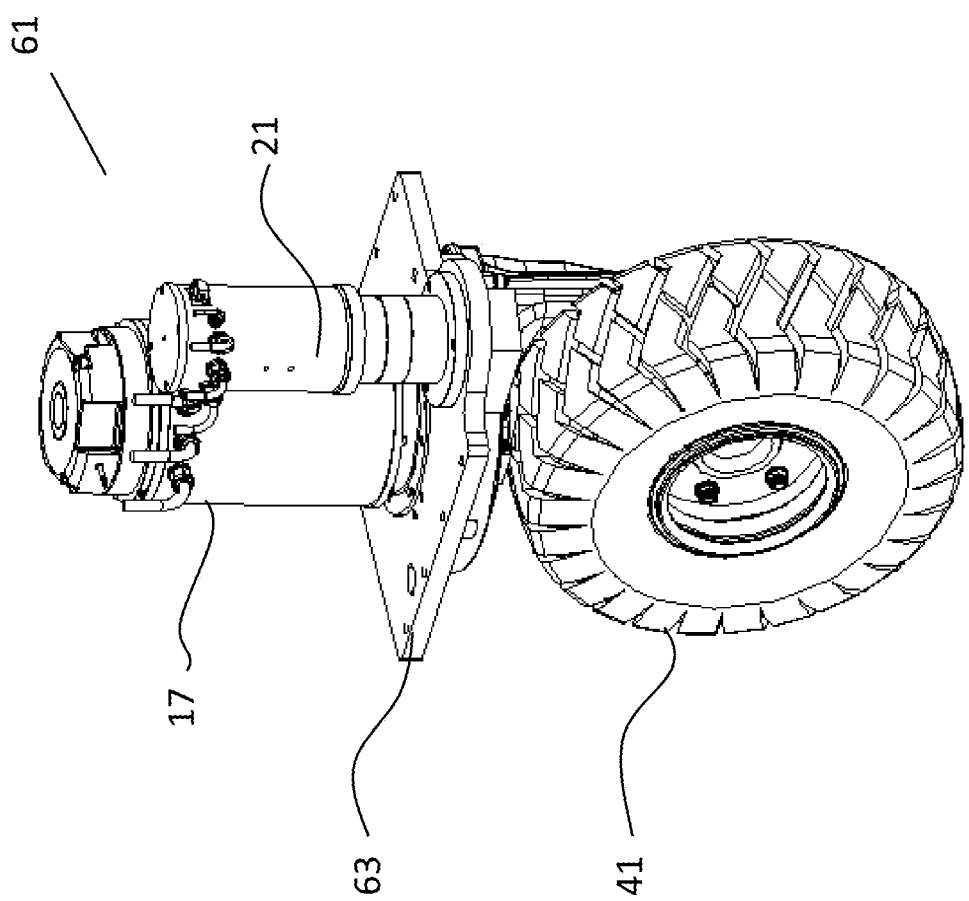
FIG. 4 is a perspective view of a rear wheel assembly.

Referring to FIG. 4, there is shown a rear wheel assembly, indicated generally by the reference numeral 61, comprising a mounting plate 63 for mounting the rear wheel 41 on the chassis (not shown) and about which the rear wheel 41 is rotatably mounted. The rear wheel assembly 61 comprises a primary drive motor 17 and a tertiary steering motor 21 mounted on the mounting plate 63. This compact configuration will allow transfer of power to the rear wheel drive motor and steering motor in an efficient manner.

In use, an operator of the piggyback forklift truck will charge the piggyback forklift trucks battery pack 23 using an available mains supply and the first electricity power supply connector 27 when the carrying vehicle is not in transit but instead is parked in a depot or like location with access to the mains power supply. It is envisaged that the first electricity power supply connector 27 may be a female connector for reception of a plug at the end of a cable carrying the mains supply. The first electricity power supply connector 27 may be provided with cabling to allow extended reach of the first connector to a charging point if desired. Before beginning a journey, the operator of the carrying vehicle 51 will connect an electrical power take off feed (not shown) from the carrying vehicle to the second electricity power supply connector 45 which in turn feeds the DC/AC converter 43. During transit, the electrical power supply of the carrying vehicle 51, typically a 24V DC supply, will be stepped up in the DC/AC power converter to 240V AC. This 240V AC signal is fed to the battery pack charging unit 25 and from there is used to charge the rechargeable battery pack 23. Preferably, the DC/AC converter 43 and the second electricity power supply connector 45 are used to trickle charge the battery pack of the piggyback forklift truck 1. It will be understood that the voltage levels described above are not intended to be limiting and are for illustrative purposes only. Other voltage levels could be used if desired.

It is envisaged that the on-board battery management system will control the charging of the cells in the rechargeable battery pack 23 and will ensure that the cells, which in this case are Lithium Ion, are not overcharged and damaged. It is further envisaged that a control system may be provided to monitor the charge condition of the carrying vehicles battery and if desired the piggyback forklift trucks battery. The control system will operate to ensure that the carrying vehicles battery will only charge the piggyback forklift trucks battery when it is necessary and/or not detrimental to the battery of the carrying vehicle or the piggyback forklift truck battery. It will be understood that it is not desirable to drain the battery of the carrying vehicle and care should be taken not to do so.

Reference is made to the carrying vehicle being "in transit". It will be understood that this does not necessarily mean that the carrying vehicle is moving and it may be stationary with the engine idling. Importantly though, the engine of the carrying vehicle will be running and charging the battery of the carrying vehicle so that the piggyback forklift trucks battery will not be charged at the expense of the integrity of the carrying vehicles battery. If a mains supply or other electricity supply other than the carrying vehicle electricity supply is available, it is preferable to have the supply other than the carrying vehicles.

It will be understood that various modifications could be made to the embodiments described above without departing from the spirit of the invention. For example, instead of providing a female connector for the first electrical power supply connector, a male connector could be provided. Furthermore, the female or male connector could be connected to the battery pack charging unit by way of an extension cable. This will facilitate plugging the battery pack charging unit into a remote power supply.

In addition to the above, instead of providing a single battery pack charging unit, a pair of battery pack charging units may be provided, one battery pack charging unit connected to the first electricity power supply connector and a second battery pack charging unit connected to the second electricity power supply connector, with both battery pack charging units then connected to the battery pack. Depending on the type of second battery pack charging unit employed (e.g. DC or AC/DC), a power converter may be required intermediate the second electricity power supply connector and the second battery pack charging unit to convert the incoming DC signal into a form suitable for the second battery pack charging unit. For example, if the second battery pack charging unit requires an AC signal, then a DC/AC converter will be required. Alternatively, if the second battery pack charging unit requires a DC signal other than 24V, a DC/DC converter will be required in order to convert the incoming 24V DC signal into an appropriate form for use by the second battery pack charging unit. Various other configurations are also envisaged and an appropriate power converter may be provided if necessary.

In this specification the terms "comprise, comprises, comprised and comprising" and the terms "include, includes, included and including" are all deemed totally interchangeable and should be afforded the widest possible interpretation.

The invention is in no way limited to the embodiment hereinbefore described but may be varied in both construction and detail within the scope of the claims.

What is claimed is:

1. A piggyback forklift truck comprising:
   a wheeled U-shaped chassis comprising a pair of forwardly projecting side bars bridged by a transverse rear crossbar;
   a lifting assembly mounted on the chassis intermediate the pair of forwardly projecting side bars;
   a driver's seating station mounted on the chassis rearward of the lifting assembly;
   a motive power unit mounted on the chassis; and in which the piggyback forklift truck is electrically powered and the motive power unit comprises:
   an electric motor;
   a rechargeable battery pack powering the electric motor;
   a first battery pack charging unit in electrical communication with the rechargeable battery pack;
   a first electricity power supply connector in electrical communication with the first battery pack charging unit;
   a DC/AC converter in electrical communication with the first battery pack charging unit; and
   a second electricity power supply connector in electrical communication with the DC/AC converter, the second electricity power supply connector being arranged for reception of an electrical power take off feed from a carrying vehicle.

2. The piggyback forklift truck as claimed in claim 1 in which there is provided a second battery pack charging unit in electrical communication with the rechargeable battery pack, and in which instead of the DC/AC converter being in electrical communication with the first battery pack charging unit, the DC/AC converter is in electrical communication with the second battery pack charging unit.

3. The piggyback forklift truck as claimed in claim 2 in which instead of providing the DC/AC converter, there is provided a DC/DC converter in electrical communication with the second battery pack charging unit and the second electricity power supply connector.

4. The piggyback forklift truck as claimed in claim 2 in which the first battery pack charging unit and the second battery pack charging unit are integrated into a single combined battery pack charging unit, the combined battery pack charging unit having the functionality of both the first and the second battery pack charging units.

5. The piggyback forklift truck as claimed in claim 1 in which there is provided a second battery pack charging unit in electrical communication with the rechargeable battery pack, and in which instead of providing the DC/AC converter in electrical communication with the second electrical power supply connector, the DC/AC converter is omitted and the second electrical power supply connector is connected directly to the second battery pack charging unit.

6. The piggyback forklift truck as claimed in claim 5 in which the first battery pack charging unit and the second battery pack charging unit are integrated into a single combined battery pack charging unit, the combined battery pack charging unit having the functionality of both the first and the second battery pack charging units.

7. The piggyback forklift truck as claimed in claim 1 in which there is provided a dedicated battery management system operable to control the charging and discharging of the rechargeable battery pack.

8. The piggyback forklift truck as claimed in claim 1 in which there is provided a pair of electric motors powered by the rechargeable battery pack, a primary drive motor and a secondary lifting assembly motor.

9. The piggyback forklift truck as claimed in claim 8 in which there is provided a third electric motor powered by the rechargeable battery pack, a tertiary steering motor.

10. The piggyback forklift truck as claimed in claim 1 in which the rechargeable battery pack comprises a lithium ion battery pack.

11. The piggyback forklift truck as claimed in claim 1 in which the first electricity power supply connector is a female connector.

12. The piggyback forklift truck as claimed in claim 1 in which the first electricity power supply connector comprises a length of electrical extension cable connected at one end to the first battery pack charging unit and having a male connector mounted on its other, free end.

13. The piggyback forklift truck as claimed in claim 1 in which the piggyback forklift truck comprises a pair of trailer front wheels, one of which is located adjacent the forwardmost end of one of the side bars and the other of which is located adjacent the forwardmost end of the other side bar, and a driving, steering rear wheel mounted about the rear crossbar driven by the electric motor.

14. The piggyback forklift truck as claimed in claim 13 in which the piggyback forklift truck comprises a rear wheel assembly comprising a mounting plate for mounting the driving, steering rear wheel on the chassis and about which the driving, steering rear wheel is rotatably mounted, and in which a primary drive motor and a tertiary steering motor are mounted on the mounting plate.

15. The method of operating a piggyback forklift truck as claimed in claim 1 comprising the steps of:
charging the rechargeable battery pack of the piggyback forklift using an electrical power take off feed from a carrying vehicle when the carrying vehicle is in transit with the piggyback forklift truck mounted thereon.

16. The method as claimed in claim 15 in which the step of charging the rechargeable battery pack of the piggyback forklift using an electrical power take off feed from a carrying vehicle comprises the steps of:
taking an electrical power take off feed from the carrying vehicle when the carrying vehicle is in transit with the piggyback forklift truck mounted thereon;
delivering the electrical power take off feed to the DC/AC converter mounted on the piggyback forklift truck;
converting the electrical power take off feed from the carrying vehicle in the DC/AC converter on the piggyback forklift truck; and
passing the converted AC electrical power take off feed to the rechargeable battery pack charging unit of the piggyback forklift truck.

17. The method as claimed in claim 15 in which the step of charging the rechargeable battery pack of the piggyback forklift using an electrical power take off feed from a carrying vehicle comprises the steps of:
taking an electrical power take off feed from the carrying vehicle when the carrying vehicle is in transit with the piggyback forklift truck mounted thereon;
delivering the DC electrical power take off feed to a second battery pack charging unit of the piggyback forklift truck.

18. The method as claimed in claim 17 in which the method comprises the intermediate step of delivering the DC electrical power take off feed to the DC/DC converter en route to the second battery pack charging unit.

19. The method as claimed in claim 17 in which the method comprises the intermediate step of delivering the DC electrical power take off feed to the DC/AC converter en route to the second battery pack charging unit.

20. The method as claimed in claim 15 comprising the step of trickle charging the rechargeable battery pack using an electrical power take off feed from a carrying vehicle when the piggyback forklift truck is in transit on the carrying vehicle.

21. The method as claimed in claim 14 comprising the step of charging the rechargeable battery pack from a mains electricity supply using the first electricity power supply connector when the carrying vehicle is not in transit.

\* \* \* \* \*